(12) United States Patent
Nagata (10) Patent No.: US 6,584,285 B2
(45) Date of Patent: Jun. 24, 2003

(54) CAMERA

(75) Inventor: Kazuaki Nagata, Saitama (JP)

(73) Assignee: Fuji Photo Optical Co., Ltd., Saitama (JP)

( * ) Notice: Subject to any disclaimer, the term of this patent is extended or adjusted under 35 U.S.C. 154(b) by 0 days.

(21) Appl. No.: 09/949,922

(22) Filed: Sep. 12, 2001

(65) Prior Publication Data

US 2002/0031344 A1 Mar. 14, 2002

(30) Foreign Application Priority Data

Sep. 12, 2000 (JP) .......................... 2000-276536

(51) Int. Cl.[7] .......................... G03B 15/03; G03B 17/02
(52) U.S. Cl. .......................... 396/177; 396/535
(58) Field of Search .......................... 396/177, 178, 396/535, 175, 176; 362/16, 17, 18

(56) References Cited

U.S. PATENT DOCUMENTS 4,920,368 A * 4/1990 Arai et al. .................. 396/177

* cited by examiner

*Primary Examiner*—David M. Gray
*Assistant Examiner*—Rochelle Blackman
(74) *Attorney, Agent, or Firm*—Birch, Stewart, Kolasch & Birch, LLP (57) ABSTRACT

The camera has a reduced pop-up amount of an electronic flash by disposing a window member which constitutes part of an outer covering in front of the electronic flash and transparently forming a portion of the window member in front of the electronic flash. An acrylic cover which constitutes an outer covering of the camera is transparently formed with an electronic flash window positioned in front of the electronic flash. The electronic flash light can be thereby emitted without being blocked even if the electronic flash does not fully project from the top surface of the camera body, thus the pop-up amount of the electronic flash can be minimized.

7 Claims, 7 Drawing Sheets

CAMERA

BACKGROUND OF THE INVENTION

1. Field of the Invention

The present invention relates to a camera, and more particularly, to a camera which is provided with a pop-up type electronic flash part.

2. Description of the Related Art

In a camera with a pop-up type electronic flash part, the electronic flash part projects from a camera body when taking pictures and is accommodated in the camera body when carrying.

In such a camera with the pop-up type electronic flash part, the electronic flash part is required to sufficiently project from the camera body so as to prevent emitted light from being blocked by the camera body.

However, when a pop-up amount of the electronic flash part is increased, there is a disadvantage of increase in forming loads of a lead wire to cause wire breaking. There is also a disadvantage of requiring a large driving force when the electronic flash part pops up.

SUMMARY OF THE INVENTION

The present invention is made in view of the above circumstances and has its object to provide a camera which has a reduced the pop-up amount of the electronic flash part.

In order to attain the above object, there is provided a camera which is provided with an electronic flash part capable of projecting and retracting from a top surface of a camera body, wherein a front surface of the camera body is mounted with a window member which constitutes part of an outer covering and has a predetermined window transparently formed, and the window member has a transparently formed portion in front of the electronic flash part to transmit part of light.

According to the present invention, the portion in front of the electronic flash part is transparently formed and can thereby transmit the emitted light. Therefore, the electronic flash light can be emitted without being blocked even if the electronic flash part does not fully project from the top surface of the camera body, thus the pop-up amount of the electronic flash part can be minimized.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein.

DETAILED DESCRIPTION OF THE PREFERRED EMBODIMENTS

Preferred embodiments of a camera according to the present invention will be described in detail below with reference to the drawings.

Figure 1:
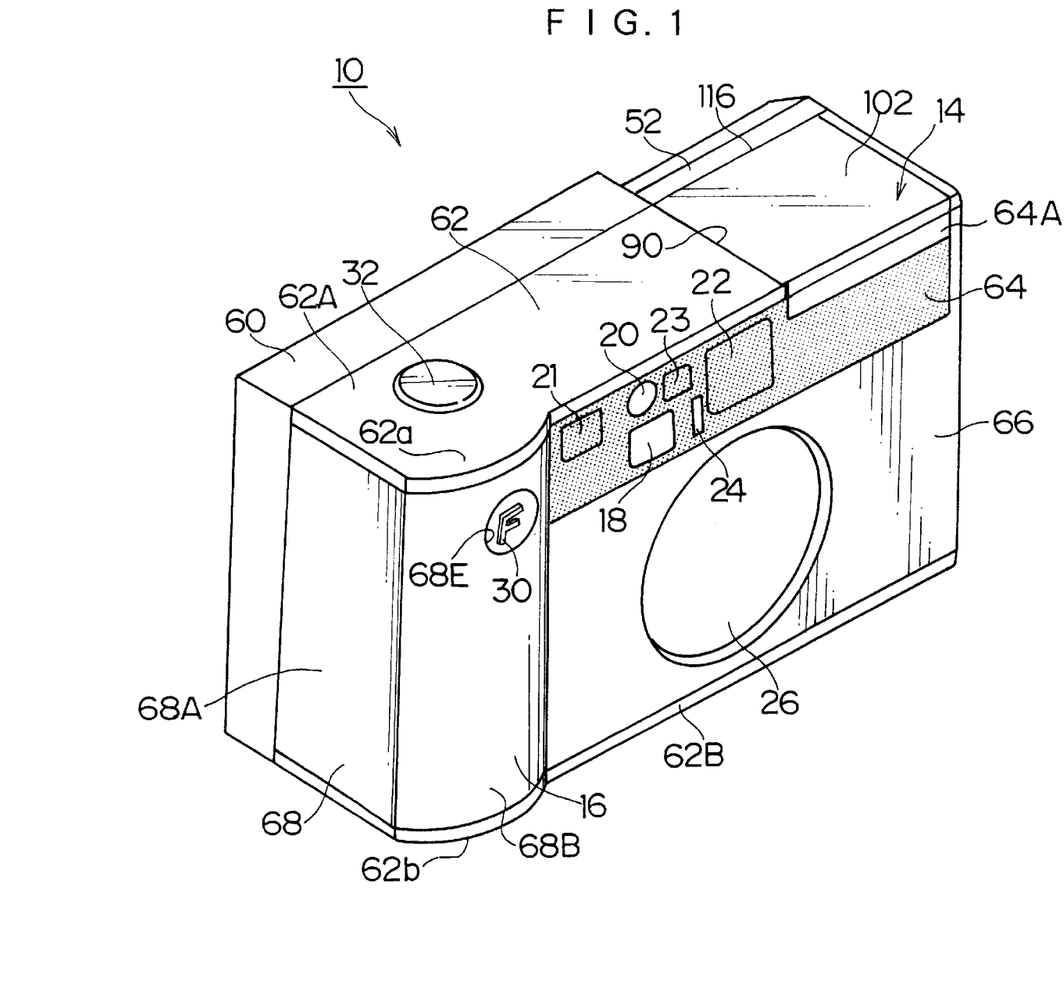
FIG. 1 is a front perspective view of an appearance of a camera according to an embodiment of the present invention.
Figure 2:
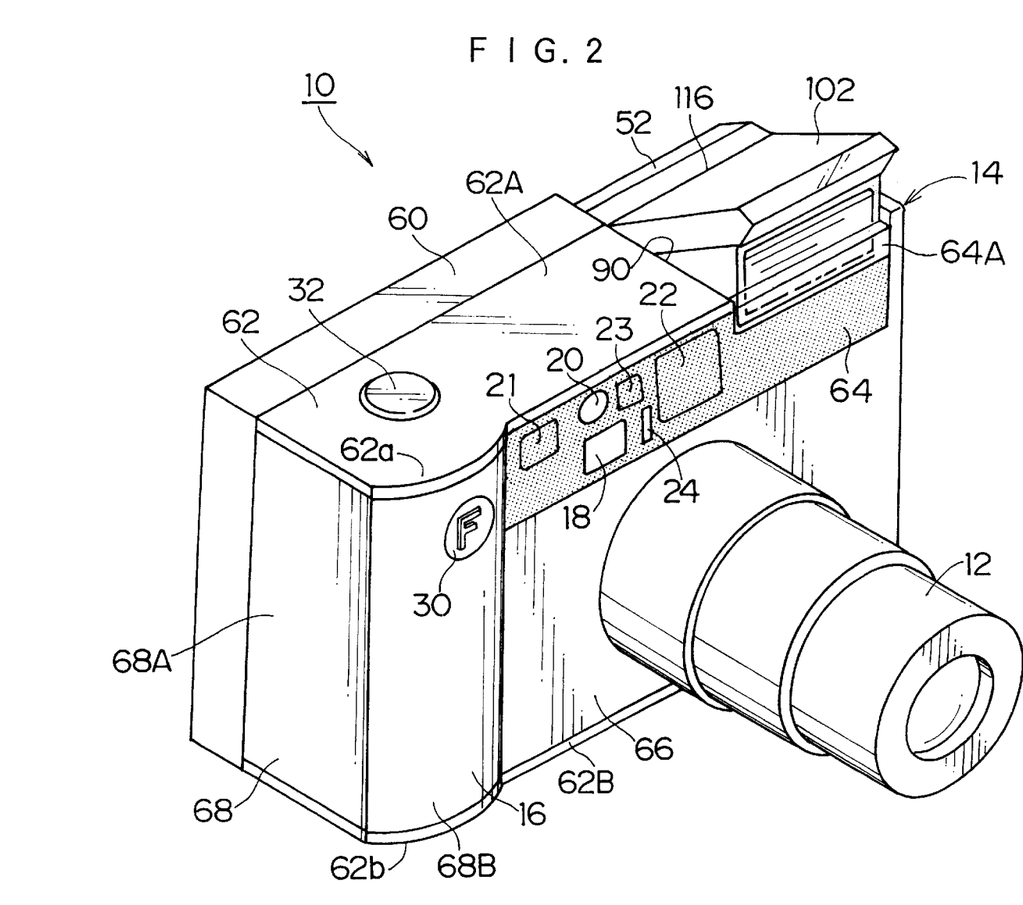
FIG. 2 is a front perspective view of the appearance of the camera according to the embodiment.

FIGS. 1 and 2, respectively are front perspective views of appearance configurations of a camera to which the present invention is applied. A camera 10 shown in the figure is an APS camera, and a front surface of a camera body 10A is provided with a lens barrel 12, electronic flash part 14, grip 16, finder window 18, AE light receiving window 20, AF light receiving window 21, AF light projecting window 22, remote control light receiving window 23 and self-timer lamp 24.

The lens barrel 12 is provided substantially in the center of the front surface of the camera body 10A and has a zoom function. The lens barrel 12 is of the collapsible barrel type and is extended when the camera 10 is switched on, and collapsed when the camera 10 is switched off. When the lens barrel 12 is collapsed, the front surface of the camera body 10A becomes flattened, and a lens barrier 26 is shut in front of the collapsed lens barrel 12.

The electronic flash part 14 is provided on an upper right corner of the front surface of the camera body 10A. The electronic flash part 14 is of the pop-up type and is provided capable of projecting and retracting from a top surface of the camera body 10A. That is, as shown in FIGS. 6(a) and 6(b), the electronic flash part 14 comprises an electronic flash cover 102 pivotably supported by a camera body 56 via a pin 100, and a light emitting tube 104 and reflection umbrella 106 are provided inside the electronic flash cover 102. As shown in FIG. 6(a), the electronic flash part 14 is accommodated in the camera body 10A when carrying, and when taking pictures, the electronic flash cover 102 is driven by an unshown motor to be pivoted and to project from the top surface of the camera body 10A as shown in FIG. 6(b).

The grip 16 is formed with a predetermined width on a left edge of the front surface of the camera body 10A. The grip 16 is formed with a forward arcuate bulge, and around a top end of the front surface, a circular electroformed nameplate 30 to which a trademark is applied is provided. Further, a shutter button 32 is provided on a top surface of the grip 16, and an unshown cartridge cap is provided on a bottom surface of the grip 16.

The finder window 18 is provided above the lens barrel 12, and the AE light receiving window 20 and remote control light receiving window 23 are provided above the finder window 18. The AF light receiving window 21 and AF light projecting window 22 are provided so as to sandwich the AE light receiving window 20 and remote control light receiving window 23, and the self-timer lamp 24 is provided on the right of the finder window 18.

Figure 3:
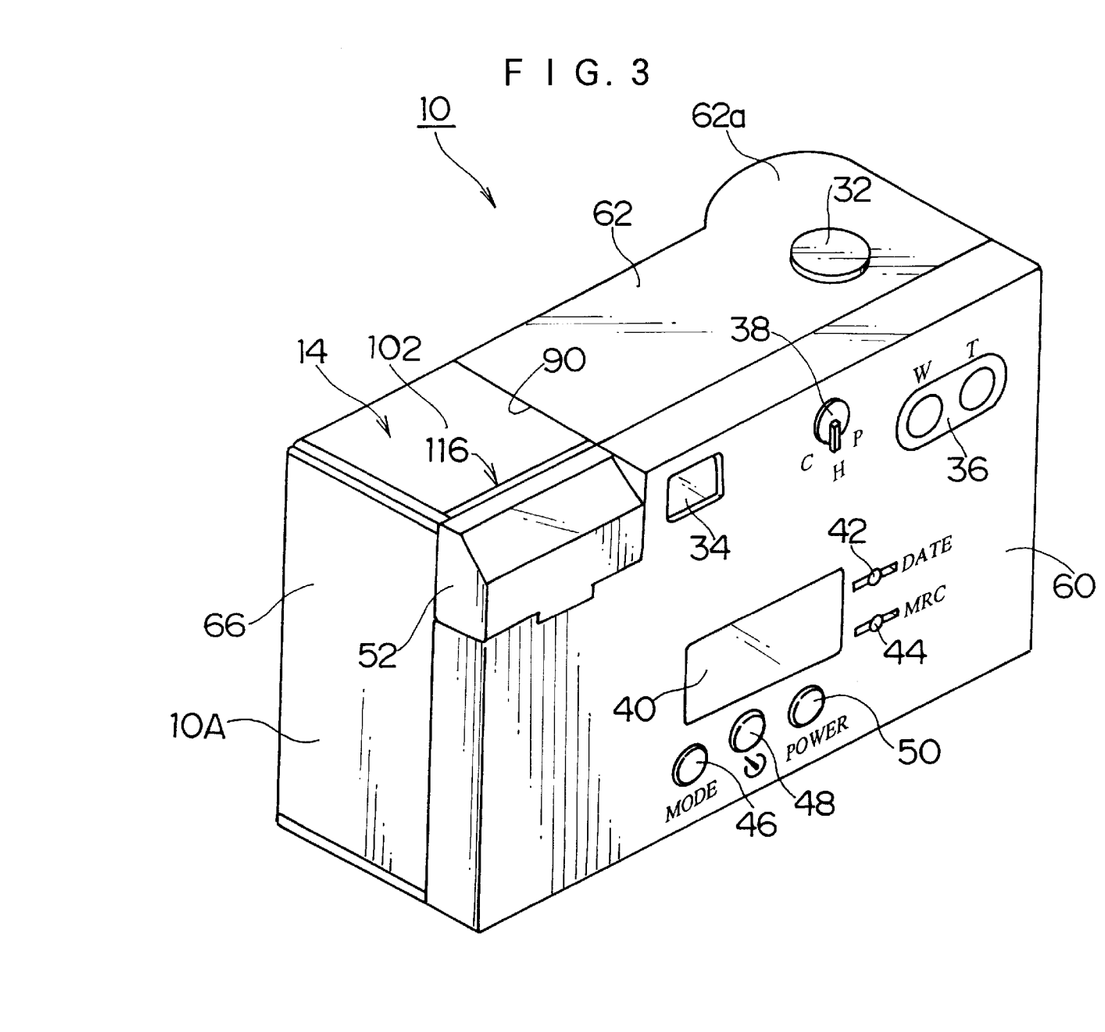
FIG. 3 is a back perspective view of the appearance of the camera according to the embodiment.

FIG. 3 is a back perspective view of the appearance configuration of the camera to which the present invention is applied. As shown in the figure, provided on a back surface of the camera body 10A are a finder ocular window 34, zoom lever 36, print type switching knob 38, liquid crystal panel 40, date button 42, MRC button 44, mode button 46, self-timer button 48, power button 50 and battery cap 52.

The zoom lever 36 is provided on an upper right corner of the back surface of the camera body 10A, and by operating the zoom lever 36, zooming is carried out.

The print type switching knob 38 is provided on a left side of the zoom lever 36, and by operating the print type switching knob 38, print types are switched among a conventional type (C), high vision type (H) and panorama type (P).

The liquid crystal panel 40 is formed in a rectangular shape and provided substantially in the center of the back surface of the camera body 10A. Displayed on the liquid crystal panel 40 are the number of exposures, taking mode, cartridge mark, self-timer mode, battery capacity, date, kinds of film, sensitivity of film, or the like.

The date button 42 is disposed on the right of the liquid crystal panel 40, and by operating the date button 42, writing of the date is selected. The MRC button 44 is similarly disposed on the right of the liquid crystal panel 40, and by operating the MRC button 44, halfway replacement of the film is selected.

The mode button 46, self-timer button 48, and power button 50 are disposed in parallel below the liquid crystal panel 40. By operating the mode button 46, the taking mode is selected, and by operating the self-timer button 48, the self-timer function is selected. By operating the power button 50, the camera 10 is switched on/off.

The battery cap 52 is disposed backward of the electronic flash part 14. The battery cap 52 is pivotably supported by a rear cover 60 via a pin 108. Inside the battery cap 52, as shown in FIGS. 6(a) and 6(b), a battery room 112 is formed by a semi-arcuate partition wall 110, and a battery 114 is loaded in the battery room 112.

As shown in FIGS. 6(a) and 6(b), a predetermined clearance 116 is formed between a tip edge 52a of the battery cap 52 and a rear edge 102a of the electronic flash cover 102, and the battery cap 52 is opened by hooking a nail onto the clearance 116.

In this way, disposing the battery cap 52 backward of the electronic flash part 14 and opening and closing the battery cap 52 using the clearance 116 formed between the battery cap 52 and the pivot of the electronic flash part 14 eliminate the need for separately providing a projection or the like for opening and closing on the battery cap 52, thus an appearance of the camera can be improved.

Figure 6:
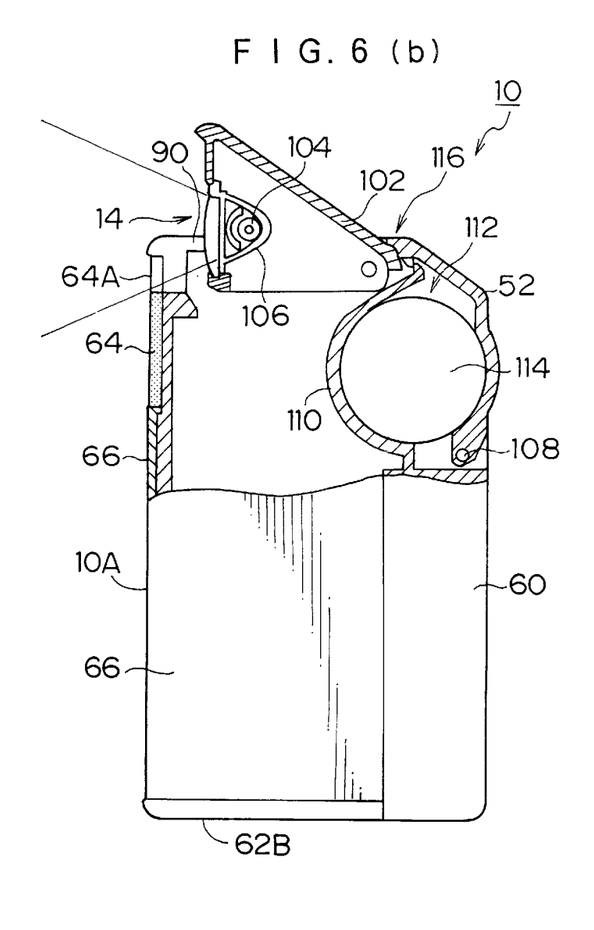
FIGS. 6(a) and 6(b) are sectional views of a side portion of the camera when carrying and taking pictures, respectively.

As shown in FIG. 6, the battery cap 52 is preferably provided with an inclined surface on its back surface. An inclination angle of the inclined surface is preferably matched with an inclination angle of the electronic flash cover 102 of the popping up electronic flash part 14. This can provide an excellent appearance configuration of the whole camera when the electronic flash part 14 pops up.

Figure 4:
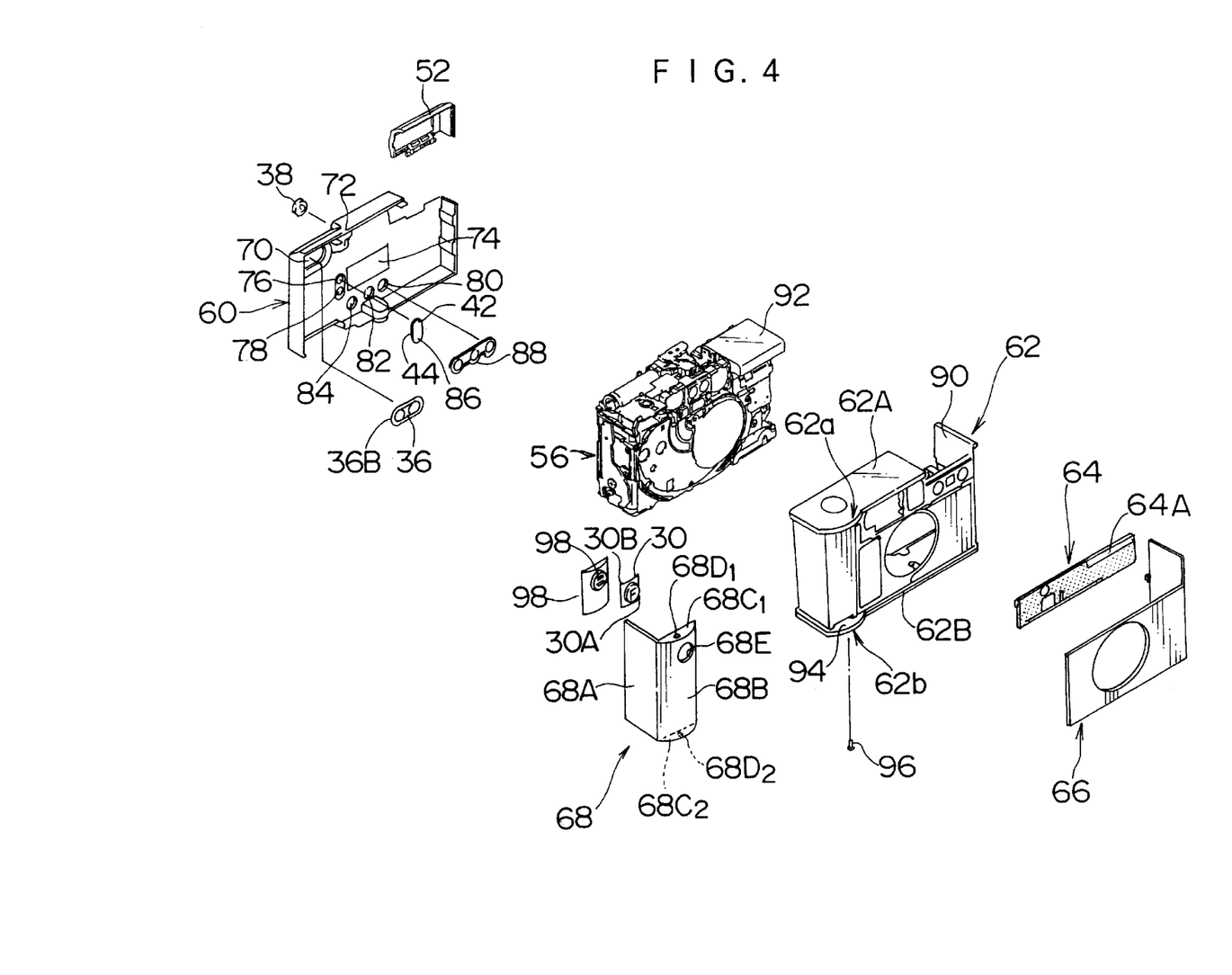
FIG. 4 is an exploded perspective view of the camera according to the embodiment.

FIG. 4 is an exploded perspective view of the camera to which the present invention is applied. As shown in the figure, the outer covering which covers the camera body 56 mainly comprises a rear cover 60, front cover 62, acrylic cover (window member) 64, metal cover 66 and grip cover 68.

The rear cover 60 is formed from plastic. Formed on a back surface of the rear cover 60 are an opening for zoom lever 70, opening for print type switching knob 72, opening for liquid crystal panel 74, opening for date button 76, opening for MRC button 78, opening for mode button 80, opening for self-timer button 82 and opening for power button 84. Various kinds of buttons disposed on the back surface of the camera body 10A are fitted in respective corresponding openings to be mounted thereto. That is, the zoom lever 36 is fitted in the opening for zoom lever 70 to be mounted thereto; the print type switching knob 38, in the opening for print type switching knob 72; the liquid crystal panel 40, in the opening for liquid crystal panel 74; the date button 42, in the opening for date button 76; the MRC button 44, in the opening for MRC button 78; the mode button 46, in the opening for mode button 80; the self-timer button 48, in the opening for self-timer button 82; and the power button 50, in the opening for power button 84.

Both of the date button 42 and MRC button 44 are formed from rubber and integrally formed with a predetermined space on a base member 86. For this reason, mounting of the date button 42 and MRC button 44 to the rear cover 60 is carried out by fitting the integrated date button 42 and MRC button 44 in the opening for date button 76 and opening for MRC button 78, respectively, from inside the rear cover 60. For the integral piece of the date button 42 and MRC button 44 thus mounted, the date button 42 and MRC button 44 only project from the opening for date button 76 and opening for MRC button 78 to be exposed on an outer surface of the rear cover 60.

The mode button 46, self-timer button 48, power button 50 are similarly formed from rubber and integrally formed with a predetermined space on a base member 88. For this reason, mounting of the mode button 46, self-timer button 48 and power button 50 to the rear cover 60 is carried out by fitting the integrated mode button 46, self-timer button 48 and power button 50 in the opening for mode button 80, opening for self-timer button 82 and opening for power button 84, respectively, from inside the rear cover 60. For the integral piece of the mode button 46, self-timer button 48 and power button 50 thus mounted, the mode button 46, self-timer button 48 and power button 50 only project from the opening for mode button 80, opening for self-timer button 82 and opening for power button 84 to be exposed on the outer surface of the rear cover 60.

The zoom lever 36 is formed with a flange 36B at its outer peripheral edge, and when the zoom lever 36 is mounted to the opening for zoom lever 70 from inside the rear cover 60, the zoom lever 36 only projects from the opening for zoom lever 70 to be exposed on the outer surface of the rear cover 60.

Now, when the rear cover 60 mounted with various kinds of operation buttons or the like as described above is mounted to the camera body 56, the outer surface of the rear cover 60 as it is constitutes an appearance of the camera 10. For this reason, the outer surface of the rear cover 60 is coated with rubber and matted.

On the other hand, for the various kinds of operation buttons provided on the outer surface of the rear cover 60 which is thus matted, their respective surfaces are treated to be smooth. That is, the outer surfaces of the zoom lever 36, mode button 46, self-timer button 48 and power button 50 are treated to be smooth.

As described above, the mode button 46, self-timer button 48, power button 50 are integrally formed on the base member 88, and the integral piece is treated to be smooth at portions appearing on the outer surface of the rear cover 60 only, that is, the buttons only. Similarly, the zoom lever 36 is treated to be smooth at portions appearing on the outer surface of the rear cover 60 only, that is, the buttons only.

The integral piece of the mode button 46, self-timer button 48, power button 50 is molded by pouring rubber into a predetermined mold, and at this time, by polishing portions of the mold corresponding to the buttons, the buttons only of the molded integral piece can be treated to be smooth.

The front cover 62 is formed from plastic similarly to the rear cover 60. A top surface (top cover) 62A and bottom surface (bottom cover) 62B only of the front cover 62 constitute the appearance of the camera 10, and top and both side surfaces thereof are mounted with the acrylic cover 64, metal cover 66 and grip cover 68 to be covered with them. The top surface 62A and bottom surface 62B which constitute an appearance surface are coated with rubber and matted similarly to the rear cover 60.

An electronic flash opening 90 is formed on a right corner of the top surface 62A of the front cover 62, and the electronic flash cover 102 of the electronic flash part 14 provided in the camera body 56 is fitted in the electronic flash opening 90. The electronic flash cover 102 is formed from plastic, and its top surface is coated with rubber and matted similarly to the front cover 62.

The metal cover 66 is formed by machining an aluminum plate to be of L shape, and its surface is anodized. The metal cover 66 is mounted so as to surround the front and right side surfaces of the front cover 62.

The front cover 62 to which the metal cover 66 is mounted is formed in such a manner that the top surface 62A and bottom surface 62B project the length corresponding to the thickness of the metal cover 66 or the thickness plus about 0.2 mm. The metal cover 66 is mounted so as to be fitted between the top surface 62A and bottom surface 62B of the front cover 62 thus formed in a projecting manner.

When top and bottom end surfaces of the metal cover 66 extend beyond the front cover 62 by errors in shape or mounting of the front cover 62 or metal cover 66, there is a possibility of detracting from the appearance of the camera, therefore, the top surface 62A and bottom surface 62B of the front cover 62 are preferably formed so as to project the length slightly larger than the thickness of the metal cover 66.

The metal cover 66 is secured to the front cover 62 by a double-faced adhesive tape or an adhesive.

Figure 5:
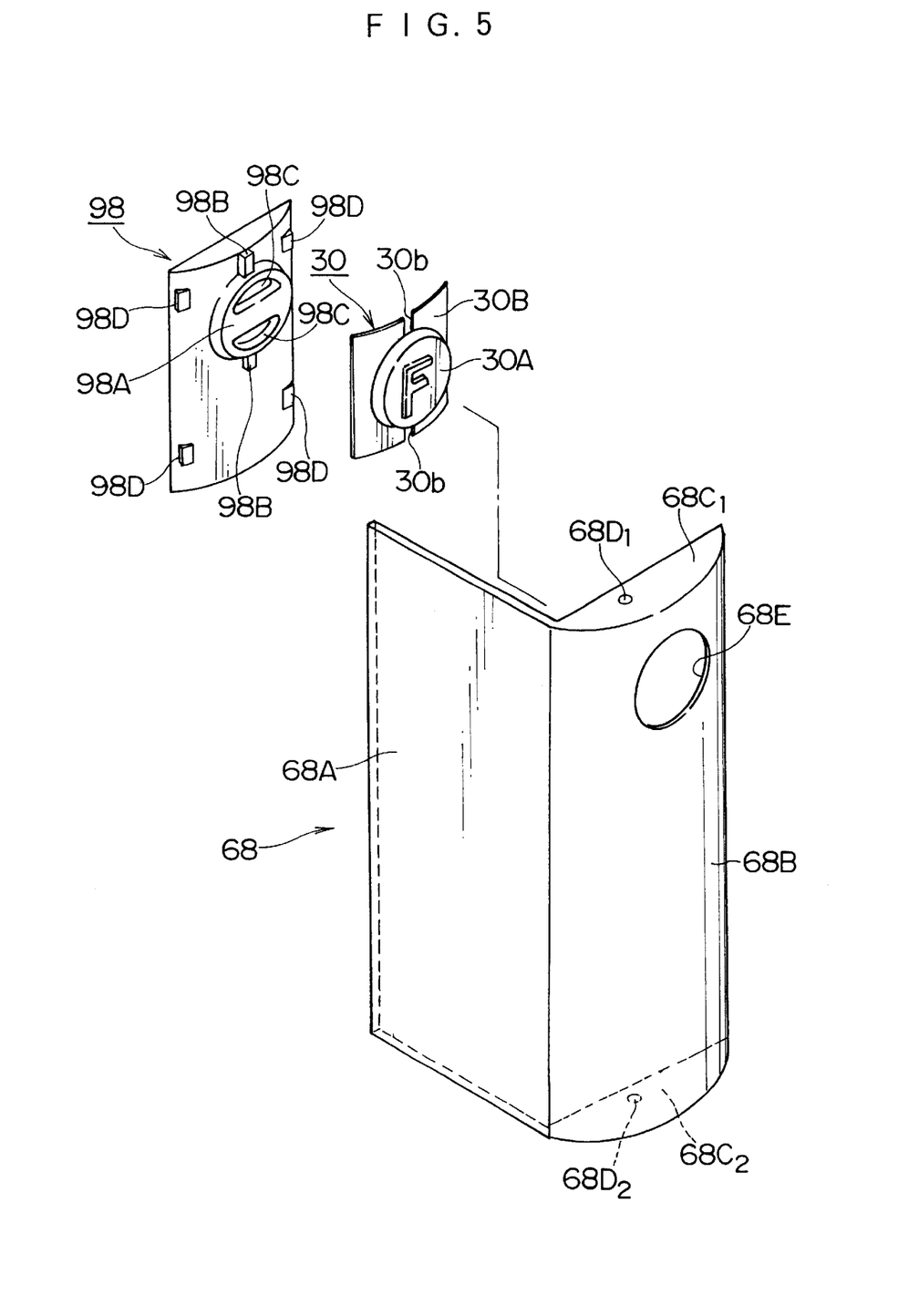
FIG. 5 is a perspective view of configurations of an electroformed nameplate and a grip cover.

The grip cover 68 is similarly formed by machining an aluminum plate, and its surface is anodized. The grip cover 68 is, as shown in FIG. 5, constituted by a side portion 68A and grip portion 68B and mounted so as to surround a left side portion and front grip portion of the front cover 62.

The side portion 68A is formed in the shape of a rectangular plate, and the left side of the front cover 62 is covered with the side portion 68A.

On the other hand, the grip portion 68B is formed in an arcuate shape, and at the top and bottom thereof, crescent reinforcing portions $68C_1$, $68C_2$ are respectively formed. The reinforcing portions $68C_1$, $68C_2$ are integrally molded with the top and bottom, respectively of the grip portion 68B by drawing. The upper reinforcing portion $68C_1$ is formed with a positioning hole $68D_1$, and the lower reinforcing portion $68C_2$ is formed with a screw hole $68D_2$.

The front cover 62 to which the grip cover 68 is mounted is formed, at its top surface 62A, with a protruding portion 62a in an arcuate shape, and an unshown positioning pin is formed in a projecting manner on a lower surface of the protruding portion 62a. When the grip cover 68 is mounted to the front cover 62, the positioning pin is fitted in the positioning hole $68D_1$ formed in the upper reinforcing portion $68C_1$. This allows the grip cover 68 to be correctly mounted to a normal position.

The front cover 62 is also formed, at its bottom surface 62B, with a similar arcuate protruding portion 62b, and a screw hole 94 is formed in the protruding portion 62b. When the grip cover 68 is mounted to the front cover 62 as described above, the screw hole $68D_2$ formed in the lower reinforcing portion $68C_2$ is positioned coaxially with the screw hole 94 formed in the protruding portion 62b. The screw 96 is screwed in the screw holes $68D_2$, 94 from the bottom surface side of the front cover 62, which secures the grip cover 68 to the front cover 62.

The grip portion 68B of the grip cover 68 is formed with a circular electroformed nameplate mounting hole 68E, and the electroformed nameplate 30 is mounted to the electroformed nameplate mounting hole 68E via an electroformed nameplate mounting plate 98.

A surface of the electroformed nameplate mounting plate 98 for mounting the electroformed nameplate 30 is, as shown in FIG. 5, formed in an arcuate shape along the shape of the grip portion 68B and has a nameplate mounting portion 98A in a disk shape around the top.

The electroformed nameplate 30 is also formed, as a whole, so as to be curved in an arcuate shape along the shape of the grip portion 68B. The electroformed nameplate 30 comprises a nameplate portion 30A in a disk shape and a flange 30B, and is mounted to the electroformed nameplate mounting plate 98 by fitting the nameplate portion 30A to the nameplate mounting portion 98A of the electroformed nameplate mounting plate 98. That is, the nameplate portion 30A of the electroformed nameplate 30 is formed in a projecting manner from the flange 30B, and its back surface is hollow along the projecting shape of the front surface. Therefore, by fitting the hollow portion of the back surface to the nameplate mounting portion 98A of the electroformed nameplate mounting plate 98, the electroformed nameplate 30 is mounted to the electroformed nameplate mounting plate 98.

The flange 30B of the electroformed nameplate 30 is formed with notches for positioning 30b, 30b at its top and bottom positions, and the notches for positioning 30b, 30b are fitted to positioning projections 98B, 98B formed on the surface of the electroformed nameplate mounting plate 98. This allows the electroformed nameplate 30 to be mounted to a normal position of the electroformed nameplate mounting plate 98.

The nameplate mounting portion 98A of the electroformed nameplate mounting plate 98 is formed with a pair of through holes 98C, 98C. The electroformed nameplate 30 mounted to the electroformed nameplate mounting plate 98 is secured to the surface of the electroformed nameplate mounting plate 98 by pouring the adhesive from the back side into the through holes 98C, 98C.

Then, the electroformed nameplate 30 mounted to the electroformed nameplate mounting plate 98 as described above is, as shown in FIG. 4, mounted to the grip portion 68B by fitting the nameplate portion 30A in the nameplate mounting hole 68E formed in the grip portion 68B. At this time, the electroformed nameplate mounting plate 98 is secured to the inner surface of the grip portion 68B by applying the adhesive to legs 98D, 98D, . . . formed on the four corners of the surface.

The electroformed nameplate 30 is thereby mounted to the grip cover 68. Then, for the electroformed nameplate 30 thus mounted, the nameplate portion 30A only to which a trademark is applied on its surface appears outwardly of the grip cover 68.

The acrylic cover 64 is mounted so as to cover the upper portion of the front surface of the front cover 62 where the finder window 18 or the like is disposed. The acrylic cover 64 is formed in the shape of a rectangular plate from a transparent acrylic plate, and is mounted so as to extend from a boundary of the grip cover 68 to the front of the electronic flash part 14. The back surface thereof is subjected to visible light cut printing. The visible light cut printing is provided on parts other than locating portions of the finder window 18, AE light receiving window 20, self-timer lamp 24 and electronic flash part 14, and the locating portions of the finder window 18, AE light receiving window 20, self-timer lamp 24 and electronic flash part 14 are transparently formed.

The transparent portion (hereinafter referred to the "electronic flash window") 64A formed on the locating portion of the electronic flash part 14 is formed corresponding to the electronic flash opening 90 formed on the top surface 62A of the front cover 62. That is, the acrylic cover 64 is mounted so as to block the front surface of the electronic flash opening 90, and the electronic flash window 64A is transparently formed so as to block the front surface of the electronic flash opening 90.

Figure 7A:
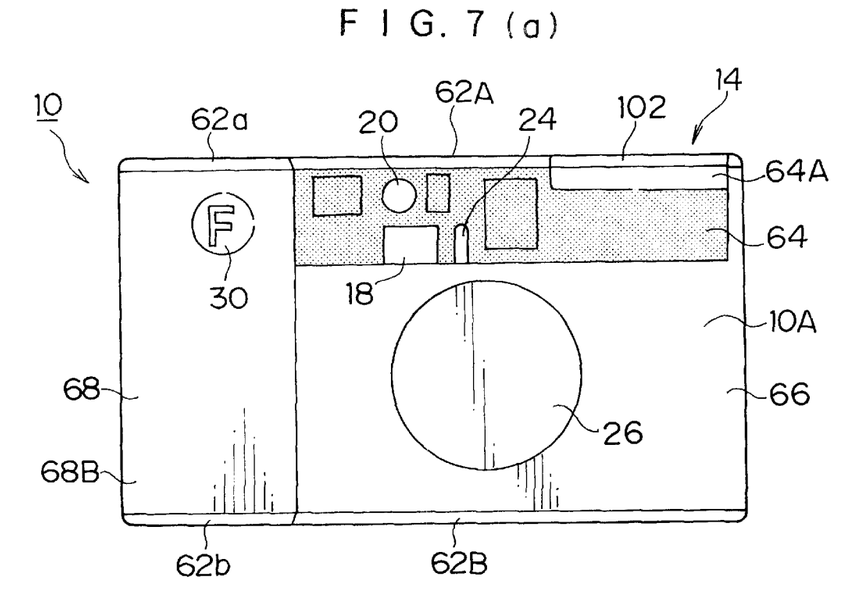
FIGS. 7(a) and 7(b) are front views of the camera when carrying and taking pictures, respectively.
Figure 7B:
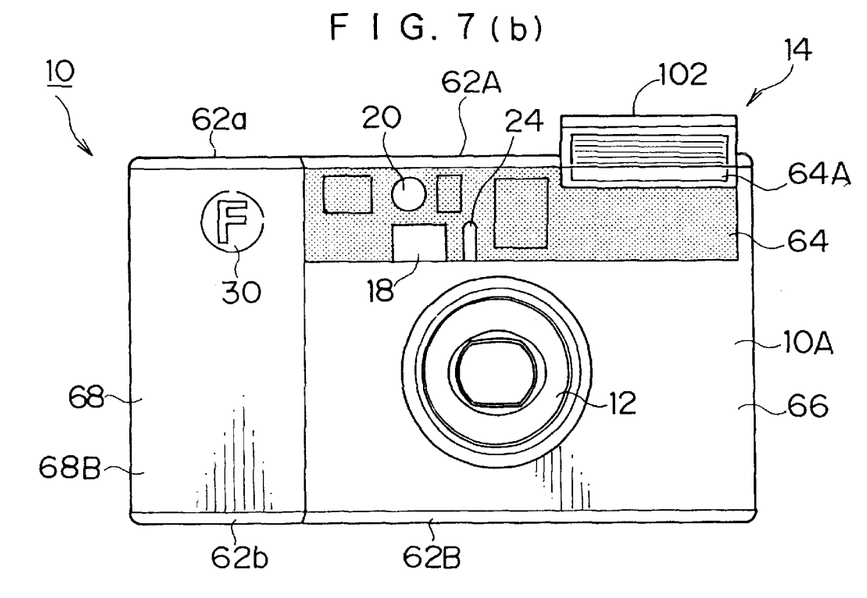

When mounting the acrylic cover 64 so as to block the front surface of the electronic flash opening 90, as shown in FIGS. 6(*b*) and 7(*b*), part of the acrylic cover 64 is disposed in front of the electronic flash part 14. The electronic flash window 64A disposed in front of the electronic flash part 14 is transparently formed as described above, emitted light is not blocked by the acrylic cover 64.

The visible light cut printing is provided on the parts other than the locating portions of the finder window 18, AE light receiving window 20, self-timer lamp 24 and electronic flash part 14, and this is because excess light other than infrared light has to be cut at the AF light receiving window 21, AF light projecting window 22 and remote control light receiving window 23.

As described above, the front cover 62 is mounted with the acrylic cover 64, metal cover 66 and grip cover 68, and this integral piece is mounted to the front surface of the camera body 56. Then, the front cover 62 mounted to the camera body 56 is made integral with the rear cover 60 mounted to the back surface of the camera body 56 to constitute the outer covering of the camera 10.

Effects of the camera 10 of this embodiment configured as described above are as follows.

When carrying, as shown in FIGS. 1, 6(*a*) and 7(*a*), the electronic flash part 14 is accommodated in the camera body 10A and the top surface of the camera body 10A is flattened.

On the other hand, when the camera 10 is switched on, the electronic flash part 14 pivots about the pin 100 to project from the top surface of the camera body 10A as shown in FIGS. 2, 6(*b*) and 7(*b*). At this time, the electronic flash part 14 projects from the top surface of the camera body 10A in such a manner that the light emitting surface is perpendicular to the top surface of the camera body 10A.

As shown in FIGS. 6(*b*) and 7(*b*), the electronic flash part 14 does not fully project from the top surface of the camera body 10A, but projects with part buried in the camera body 10A. A front side of the portion thus buried in the camera body 10A is covered with the acrylic cover 64.

However, the electronic flash window 64A of the acrylic cover 64 disposed in front of the electronic flash part 14 is transparently formed, thus when the electronic flash part 14 emits light, the emitted light is not blocked.

In this way, according to the camera 10 of this embodiment, by transparently forming the acrylic cover 64 disposed in front of the electronic flash part 14, the electronic flash light can be emitted without being blocked even if the electronic flash part 14 does not fully project from the top surface of the camera body 10A.

Therefore, according to this embodiment, a pop-up amount of the electronic flash part 14 can be minimized.

This allows the electronic flash part 14 to pop up by a small driving force when the electronic flash part 14 pops up.

The electronic flash part 14 is provided with a lead wire for supplying power, and by reducing the pop-up amount (pop-up angle) of the electronic flash part 14 as this embodiment, forming loads of the lead wire can be reduced to effectively prevent occurrence of wire breaking or the like.

In this embodiment, description has been made on the example where the present invention is applied to the camera of the type such that the electronic flash part 14 pivots to pop up, but the present invention can be effectively applied to an electronic flash part of the type such that the electronic flash part 14 vertically moves from the top surface of the camera body 10A to pop up.

As described above, according to the present invention, the portion in front of the electronic flash part is transparently formed and can thereby transmit the emitted light. Therefore, the electronic flash light can be emitted without being blocked even if the electronic flash part does not fully project from the top surface of the camera body, thus the pop-up amount of the electronic flash part can be minimized.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A camera which is provided with an electronic flash part capable of projecting and retracting from a top surface of a camera body, wherein a front surface of the camera body is mounted with a window member which constitutes part of an outer covering and has a predetermined window transparently formed, and the window member has a transparently formed portion in front of the electronic flash part to transmit part of light emitted from the electronic flash part.

2. The camera according to claim 1, wherein the window member is a transparent member formed into a plate shape which is subjected to visible light cut printing at portions other than the window and the portion in front of the electronic flash part.

3. A camera which is provided with an electronic flash part capable of projecting and retracting from a top surface of a camera body, wherein a front surface of the camera body is mounted with a window member which constitutes part of an outer covering and has a predetermined window transparently formed, and the window member has a transparently formed portion in front of the electronic flash part, such that when the electronic flash part is projected from the camera body, part of light emitted from the electronic flash part is transmitted through the window member.

4. The camera according to claim 3, wherein the window member is a transparent member formed into a plate shape which is subjected to visible light cut printing at portions other than the window and the portion in front of the electronic flash part.

5. A method for providing a camera with an electronic flash part, the method comprising:

providing an electronic flash part capable of projecting and retracting from a top surface of a camera;

providing a window member mounted on a front surface of the camera body,
  wherein the window member constitutes part of an outer covering and has a predetermined window transparently formed, and
  wherein the window portion has a transparently formed portion in front of the electronic flash part; and
operating the electronic flash part, wherein when the electronic flash part is projected from the camera body, a part of light emitted from the electronic flash part is transmitted through the window member.

6. The method according to claim 5, wherein the window member is a transparent member formed into a plate shape which is subjected to visible light cut printing at portions other than the window and the portion in front of the electronic flash part.

7. A camera provided with an electronic flash capable of projecting and retracting from a top surface of a camera body,
  wherein a front surface of the camera body is mounted with a window member which constitutes part of an outer covering and has a predetermined window transparently formed, and
  wherein the window member has a transparently formed portion in front of the electronic flash part, such that when the electronic flash part is projected from the camera body, a portion of the electronic flash part remains embedded in the camera body, wherein part of light emitted from the electronic flash part is transmitted through the transparent window.

* * * * *